United States Patent [19]

Goode

[11] 4,088,208
[45] May 9, 1978

[54] TRANSMISSION DISCONNECT SYSTEM

[75] Inventor: Frederick R. Goode, Lindenhurst, Ill.

[73] Assignee: International Harvester Company, Chicago, Ill.

[21] Appl. No.: 735,298

[22] Filed: Oct. 26, 1976

[51] Int. Cl.² .................. B60K 41/26; F16D 41/24
[52] U.S. Cl. .................................................. 192/4 A
[58] Field of Search ............................ 192/4 A, 4 R

[56] References Cited

U.S. PATENT DOCUMENTS

| | | | |
|---|---|---|---|
| 3,948,366 | 4/1976 | Kitano et al. | 192/4 A |
| 3,957,143 | 5/1976 | Barth | 192/4 A |
| 3,999,641 | 12/1976 | Luttrell | 192/4 A |

*Primary Examiner*—Leonard H. Gerin
*Attorney, Agent, or Firm*—Ronald C. Kamp; F. David AuBuchon

[57] ABSTRACT

A system for disconnecting or neutralizing a transmission including a normally open switch, which is closed upon depression of the secondary brake pedal, wired in series with a brake light switch and the coil of a solenoid operated valve. When the coil is energized the valve is shifted to cause the transmission to be neutralized.

4 Claims, 1 Drawing Figure

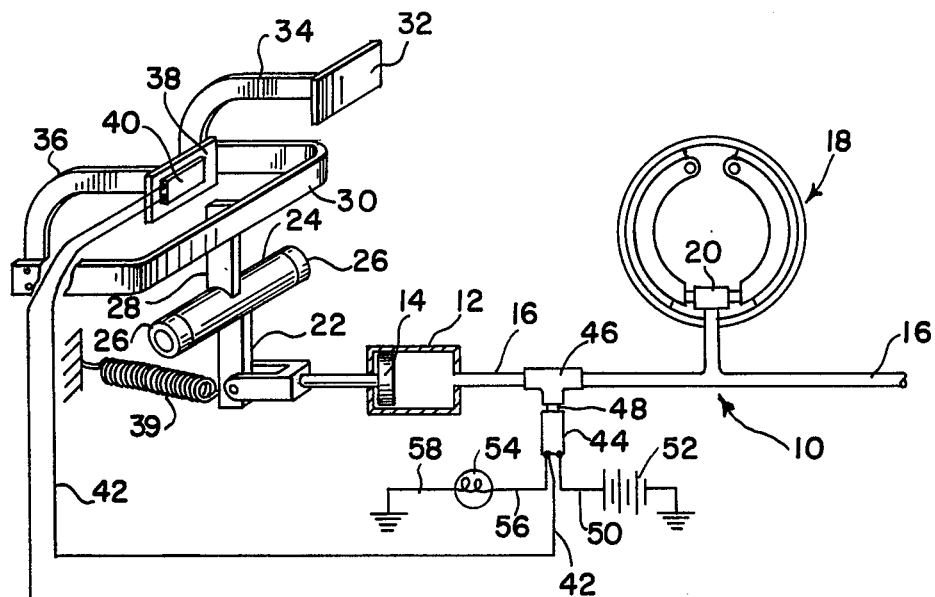
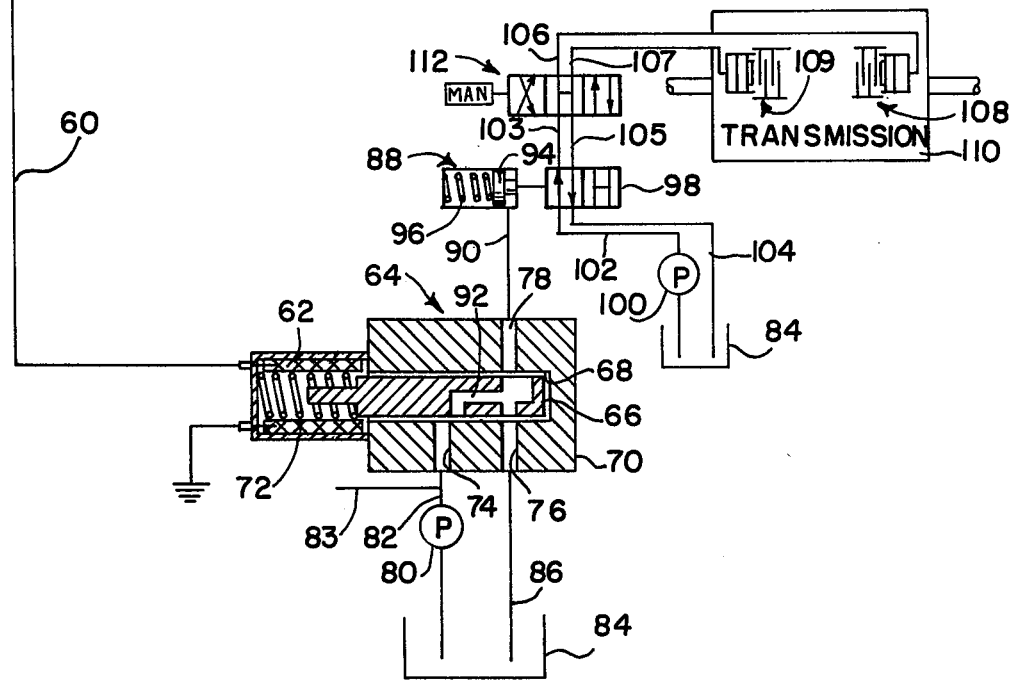

TRANSMISSION DISCONNECT SYSTEM

Systems or arrangements for disconnecting the drive train or neutralizing the transmission have been used in construction machinery, particularly wheel loaders, for some time, as exemplified by Day et al. U.S. Pat. No. 3,050,165 issued Aug. 21, 1962. The power source utilized in such machinery powers both the drive train for propelling the vehicle and the hydraulic pumps for providing hydraulic fluid to steer the vehicle and permit manipulation of the implements carried by the vehicle. It is desirable to allow the operator to disengage the drive train in some situations so that full power is available for the hydraulic pumps. Such situations occur frequently when the vehicle is slowing its rate of travel and the hydraulic load is high, such as when a loader with a full bucket is approaching a truck. Engine speed would be dropping in such a case, and with the decrease in engine speed, the output or flow from the hydraulic pumps is also decreasing. But since hydraulic fluid flow is required to raise the bucket quickly and also to provide steering for the vehicle, it is desirable to have a high engine speed. By providing a brake pedal which disconnects or neutralizes the transmission while simultaneously slowing the rate of travel of the vehicle, it is possible for the operator to increase or maintain engine speed in order to maintain the necessary hydraulic flow from the pumps.

In other situations, it is not desirable to disconnect the drive train or neutralize the transmission when braking such as when the vehicle is being "roaded". A means which permits the operator selectively either to apply the brakes while automatically disconnecting the drive train or to apply the brakes while maintaining the drive train engaged is highly desirable.

Since the terrain over which such vehicles operate is frequently not level, it is also desirable to avoid unintentional free wheeling or coasting. If the operator should be in a situation which dictates braking with transmission disconnected, it is desirable for the brakes to engage before the transmission is neutralized. Otherwise, the vehicle, if operating on a slope, may coast for a short interval of time, that time between disconnection of the transmission and engagement of the brakes.

The selective control for either brakes alone or brakes with automatic transmission disconnect must be located in the operator's compartment or cab, while the transmission is located remote therefrom. In the case of articulated loaders, the cab and transmission may be even be located on different frame sections. In order to disconnect the transmission in response to a signal emanating from the cab, there must be some connection between the brake pedal and the transmission. In the past, this connection was provided by means of hydraulic or air hoses, or through mechanical linkages. Such connections are expensive, require a greater number of mechanical components and consume more assembly time. In addition, when the cab and transmission or an articulated loader are located on different frame sections, some hoses or linkages would extend through the articulation hinge area, which is already complicated by the presence of hydraulic lines providing communication between the pumps and the hydraulic components.

It is, therefore, an object of this invention to provide a system or arrangement for disconnecting or neutralizing the transmission of a vehicle while automatically applying the brakes, which is economical, which requires fewer mechanical components, and which is relatively easy to install and maintain.

It is also an object of this invention to provide such a system which obviates the need for mechanical linkages, hydraulic hoses, or air hoses to pass between the cab and the transmission.

It is a further object of this invention to provide such a system which precludes unintentional vehicle coasting and which assures that the brakes will be applied before the transmission is disconnected.

It is also an object of this invention to provide such a system which permits ready selectability of the amount of braking achieved before the transmission is disconnected.

These and other objects of the present invention, and many of the intended advantages thereof, will become more readily apparent from the perusal of the following specification wherein the invention is described in detail by reference to the accompanying drawings.

The drawing is a schematic view of the major portion of a system embodying the invention.

A conventional brake system, which may be either hydraulic or air-over hydraulic and may utilize disc or drum brakes or a combination thereof, is indicated generally at 10. A master cylinder 12 with a piston 14 reciprocable therein is employed in a closed circuit to direct hydraulic fluid under pressure through a line 16 to the brakes, one of which is shown schematically at 18. The line 16 communicates with the individual wheel cylinders, such as the one shown at 20, to cause application of the brakes in response to the hydraulic fluid pressure.

The piston 14 is advanced in the cylinder 12 by means of its connection to an arm 22 secured to a shaft 24 which is rotatably supported near or in the operator's compartment or cab on bearings 26 located at each end of the shaft 24. A second arm 28 is also secured to the shaft 24 and extends in the direction opposite from the arm 22. A generally U-shaped bracket 30 is affixed to the arm 28. A brake pedal 32 is affixed to one leg of the U-shaped bracket by means of a member 34. Depression of the pedal 32 causes the arm 28 to rotate the shaft 24 on its bearings 26 in a counterclockwise direction as viewed in the drawing. The arm 22 must rotate therewith and thereby force the piston 14 into the cylinder 12. A tension spring 39 connected to the arm 22 returns the piston 14 to a position shown in the drawings and causes the brakes to be released.

The other leg of U-shaped bracket 30 has a support member 36 affixed thereto which supports a secondary brake pedal 38. A normally open switch 40 is mounted on pedal 38 and is closed by the force of the operator's foot, normally a force sufficient to overcome the force of tension spring 39. An electrical conductor or wire 42 extends from the switch 40 to one terminal of a normally open pressure sensitive switch 44. The actuator for pressure switch 44 is subjected to the pressure in hydraulic line 16 by means of a T fitting 46 and a short nipple or tubing section 48. The pressure switch 44 closes when the hydraulic pressure in line 16 reaches a predetermined value and opens again when the pressure drops below that value. The pressure switch 44 may be the conventional brake light switch utilized on vehicles to energize the brake lights and is connected by means of wire 50 to one of the terminals of a battery 52. A brake light bulb is connected to wire 56 to the same side of the switch 44 as is the wire 42. The socket or holder for bulb 54 is grounded, as at 58, and consequently, when the pressure switch is closed, by pressure in line 16, the circuit is completed from the battery 52 and the bulb 54 is energized.

A wire 60 extends between the switch 40 and the coil 62 of a solenoid valve indicated generally at 64. The valve 64 includes a spool 66 which is reciprocally carried within a bore 68 formed in the valve body 70. A spring 72 urges the spool 66 toward the bottom of the bore 68. Three ports 74, 76, and 78 are formed in the valve body 70 and communicate with the bore 68. A pump 80 within conduit 82 directs fluid pressure to the port 74, the conduit 82 being branched at 83 to supply fluid for other functions on the vehicle, such as lubrication. The reservoir 84 is connected with the port 76 through a conduit 86, while the port 78 communicates with a servo 88 by means of conduit 90. The internal passages 92 within spool 66 are arranged to permit communication between port 78 and 76 while blocking port 74 when the spool is at the bottom of the bore 68, and when the spool is shifted to the left as viewed in the drawing to permit communication between the port 74 and the port 78 while blocking port 76.

The servo 88 includes a piston 94 which is biased by means of spring 96 to the right as viewed in the drawing, and is urged to the left against the bias of the spring 96 by means of pressure introduced to the servo 96 through the conduit 90. A two-position valve 98 is physically connected to and positioned by the piston 94 of the servo 88. In the normal, spring bias position, as shown in the drawing, the hydraulic pressure from the pump 100 located in conduit 102 is routed through the valve 98 to the conduit 103 and conduits 104 and 105 are in communication with the reservoir 84. When the servo 88 receives hydraulic pressure through conduit 90, the valve 98 is shifted to the left and conduits 102, 103, 104, and 105 are in communication with the reservoir 84. Conduits 103 and 105 connect with a directional control valve, indicated generally at 112. As represented in the drawing, the directional control valve is a three position, center neutral valve. When the valve 112 is moved to the left as viewed in the drawing, conduits 103 and 106 are interconnected permitting the clutch pack 108 in transmission 110 to be engageable for forward drive, while conduits 105 and 107 are interconnected connecting the reverse clutch pack 109 to the reservoir 84. When the control valve 112 is shifted to the right, conduits 103 and 107 are interconnected causing the reverse clutch pack 109 to be engaged, while conduits 106 and 105 are in communication connecting the forward clutch pack 108 to reservoir 84.

From the above it be understood that the initial depression of the pedal 38 will close the switch 40 and start to increase the pressure in line 16. The solenoid 62 will remain deenergized until the pressure in line 16 is sufficient to close switch 44. That pressure sufficient to close switch 44 will also be expanding wheel cylinder 20 in order to achieve some braking effort by brake 18. Once switch 44 closes, the circuit from the battery 52 is completed and the solenoid spool 66 will shift to direct fluid to the servo cylinder 88 to disengage the transmission. Because some braking effort is achieved before the solenoid 62 is energized, the vehicle will not unintentionally coast upon depression of pedal 38. The degree of overlap, i.e. how much braking effort is achieved before the transmission is disengaged, can be controlled or selectively adjusted by selecting different pressure switches for the switch 44. That is, by substituting for switch 44, a switch that will close at a higher or lower pressure, the overlap can be varied recognizing that manufacturing tolerances in the switches will provide a range of overlap, rather than a precise point, in installations on a multitude of vehicles.

It will also be appreciated that once the pedal 38 is released, the switch 40 will open and the solenoid 62 de-energized. The spring 72 will shift the spool 66 to the position shown in the drawing, which permits the spring 96 in servo cylinder 88 to shift the valve 98 to the position shown. The transmission 110 will therefore be returned to the condition it was in before the pedal 38 was depressed, assuming the operator did not change the position of valve 112 in the interim.

Depression of the pedal 32 will also cause application of the brakes 18 and the resulting pressure in line 16 will close switch 44. However, the switch 40 will remain open and the solenoid 62 de-energized. Consequently, the transmission 110 will remain unaffected by depression of the pedal 32.

While the invention has been described and shown with reference to a particular embodiment, it will be understood that variations are possible that would fall within the scope of the present invention, which is not intended to be limited except as defined in the following claims.

What is claimed is:

1. In a vehicle having a fluid brake circuit, a hydraulically actuated power transmission clutch and an electrical brake light circuit including a bulb and a normally open, pressure sensitive switch for energizing said bulb in response to the presence of a predetermined pressure in said fluid brake circuit, a hydraulic circuit including a solenoid valve for controlling the disengagement of said clutch; a normally open, manually actuated switch connected in series with said pressure switch and said solenoid valve wherein said solenoid valve is energized only when both switches are closed; said solenoid valve normally permitting engagement of said clutch, but when energized assuring that said clutch is disengaged.

2. In a vehicle according to claim 1, and further comprising, a master cylinder is said fluid brake circuit; linkage means for actuating said master cylinder; primary and secondary brake pedals connected to said linkage means; said manually actuated switch being closed only upon depression of said secondary pedal.

3. In a vehicle according to claim 2, and further comprising a servo cylinder communicating with said solenoid valve; a disconnect valve connected to said servo cylinder and moveable thereby; said disconnect valve normally permitting engagement of said clutch but moveable upon energization of said solenoid valve to disengage said transmission.

4. In a vehicle according to claim 3, and further comprising: a transmission valve interposed between said disconnect valve and said clutch capable of controlling engagement and disengagement of said clutch when said disconnect valve is in its normal position, but rendering it ineffective when said disconnect valve is moved by energization of said solenoid valve.

* * * * *